(12) United States Patent
Liu et al.

(10) Patent No.: US 10,572,232 B2
(45) Date of Patent: Feb. 25, 2020

(54) AUTOMATICALLY CONVERTING A TEXTUAL DATA PROMPT EMBEDDED WITHIN A GRAPHICAL USER INTERFACE (GUI) TO A WIDGET

(71) Applicant: International Business Machines Corporation, Armonk, NY (US)

(72) Inventors: Chih-Hsiung Liu, Taipei (TW); Chen Zhang, Hortolandia (BR); Jian Gang J G Jin, Shanghai (CN); Wei E Y Li, Paramus, NJ (US); Li Qiang M X Xue, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/982,037

(22) Filed: May 17, 2018

(65) Prior Publication Data
US 2019/0354351 A1 Nov. 21, 2019

(51) Int. Cl.
G06F 3/048 (2013.01)
G06F 8/38 (2018.01)
G06T 11/60 (2006.01)
H04L 12/58 (2006.01)

(52) U.S. Cl.
CPC .............. *G06F 8/38* (2013.01); *G06T 11/60* (2013.01); *H04L 51/046* (2013.01); *H04L 51/10* (2013.01); *H04L 51/18* (2013.01)

(58) Field of Classification Search
None
See application file for complete search history.

(56) References Cited

U.S. PATENT DOCUMENTS

| | | | |
|---|---|---|---|
| 2009/0006547 A1* | 1/2009 | Banatwala | G06Q 10/10 709/204 |
| 2011/0289428 A1 | 11/2011 | Yuen et al. | |
| 2013/0031082 A1 | 1/2013 | Wolfram et al. | |
| 2014/0164509 A1* | 6/2014 | Lynch | H04L 65/403 709/204 |
| 2015/0113451 A1 | 4/2015 | Kopp et al. | |
| 2017/0110127 A1* | 4/2017 | Fujii | G06F 3/16 |
| 2017/0116982 A1 | 4/2017 | Gelfenbeyn et al. | |
| 2017/0185582 A1 | 6/2017 | Gelfenbeyn et al. | |
| 2017/0353423 A1* | 12/2017 | Morrison | H04L 51/32 |
| 2018/0136794 A1* | 5/2018 | Cassidy | G06F 3/0488 |
| 2018/0248998 A1* | 8/2018 | Kim | H04M 1/72547 |
| 2018/0367964 A1* | 12/2018 | Vendrow | H04M 1/72552 |

* cited by examiner

*Primary Examiner* — Thanh T Vu
(74) *Attorney, Agent, or Firm* — Schmeiser, Olsen & Watts, LLP; Mark Vallone

(57) ABSTRACT

A method is provided to convert a textual data prompt embedded within a graphical user interface (GUI) to a widget. A textual prompt is parsed to identify parameters including a topic and an intent. An algorithm compares the parameters to additional parameters associated with widgets. When a percentage of a first match between the parameters and the additional parameters associated with a first widget exceeds a threshold, the first widget is embedded within the GUI on a second computing device. The first widget includes responses to the textual prompt. A size, a shape, and a color of the first widget mirrors the confidence threshold. When the first response is selected by a user, the first response is embedded and displayed within the GUI of the first computing device as textual data.

20 Claims, 6 Drawing Sheets

US 10,572,232 B2

AUTOMATICALLY CONVERTING A TEXTUAL DATA PROMPT EMBEDDED WITHIN A GRAPHICAL USER INTERFACE (GUI) TO A WIDGET

TECHNICAL FIELD

The present invention relates to automatically converting a textual data prompt embedded within a GUI to a widget.

BACKGROUND

Numerous computing devices include applications that provide graphical user interfaces (GUIs), allowing for interaction with users. Some applications, such as chat applications, require users to manually input text or select multimedia images as responses to inquiries from other users. However, this can be time-consuming and frustrating for users who wish to reply similarly as they have in the past or for users who wish to utilize a generic reply to the inquiry.

SUMMARY

In embodiments, the present invention provides a server, a method, and a computer program product configured to execute a method for automatically converting a textual data prompt embedded within a graphical user interface (GUI) to a widget. The method comprises: receiving, from a first computing device, the textual data prompt; parsing the textual data prompt to identify parameters that include at least a topic of the textual data prompt and an intent associated with the textual data prompt; executing an algorithm to compare the parameters of the textual data prompt to additional parameters associated with widgets; identifying a first match between the parameters and the additional parameters associated with a first widget of the widgets; and identifying a second match between the parameters and the additional parameters associated with a second widget of the widgets. In response to determining that a percentage of the first match exceeds a confidence threshold and a percentage of the second match fails to exceed the confidence threshold, the method further includes: generating the first widget embedded within the GUI on a second computing device. The first widget includes a first response to the textual data prompt and a second response to the textual data prompt. Also, a size, a shape, and a color of the first widget is based on the confidence threshold. The method further comprises: receiving a selection of the first response as a selected response to the textual data prompt by a user associated with the second computing device; and displaying the first response as textual data embedded within the first computing device.

DETAILED DESCRIPTION

Users consistently interact with computing devices via graphical user interfaces (GUIs). It becomes inconvenient and time-consuming for a second user to manually input text as a response to a first user's inquiry. Instead of inputting textual information in response to an inquiry, it would be convenient for a second user to interact with an accurately-generated widget to respond to pending questions or prompts from a first user, whereby the response of the second user is automatically converted, in real-time, into a textual response, seen by the first user. However, current solutions fail to provide for such a system. Embodiments of the present invention provide a cognitive analysis server, a cognitive analysis engine, a proxy server, or a cognitive analysis system which may, in-real time, automatically convert a textual data prompt embedded within a GUI on a computing device associated with a first user to a widget embedded within the GUI on a computing device associated with a second user.

The current invention improves the functioning of the computer itself by providing enhanced accuracy and confidence in the real-time generated widget since the widget is only generated responsive to a match (between parameters of the textual data prompt and additional parameters associated with a widget) that exceeds a confidence threshold. Further, since a size, a shape, and a color of the generated widget is based on the confidence threshold, a larger widget having light-coloring and more rounded/smooth sides than edges conveys a greater confidence and accuracy in the match to a user viewing the widget, as compared to a darker-colored widget having a smaller size and more edges than smooth or rounded sides. Based on enhanced accuracy of the generated widget (conveyed via the large size, light-coloring, and more rounded or smooth sides than edges), the user may select a response contained within the widget, in response to the textual data prompt. Based on the decreased accuracy associated with the generated widget (conveyed via the small size, dark-coloring, and more edges than smooth or round sides), the user may input textual data into the GUI directly.

Figure 1:
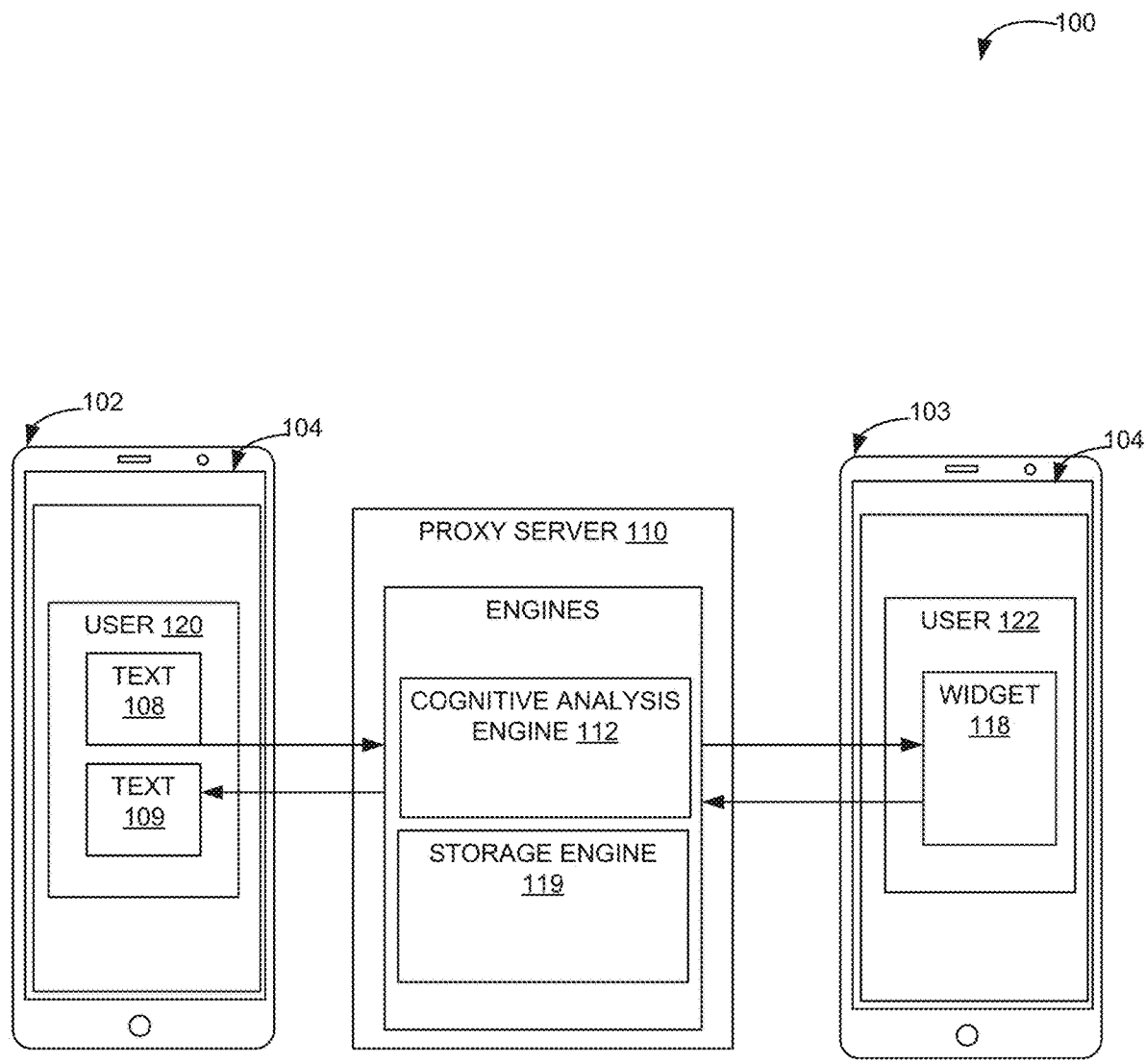
FIG. 1 is a block diagram of a system configured to automatically convert a textual data prompt embedded within a GUI to a widget, in accordance with embodiments of the present invention.

FIG. 1 is a block diagram of a system configured to automatically convert a textual data prompt embedded within a GUI to a widget, in accordance with embodiments of the present invention.

A block diagram of the system 100 may include a first computing device 102 associated with a first user 120 and a second computing device 103 associated with a second user 122. The first computing device 102 and the second computing device 103 may comprise a laptop computer, a smartphone, a desktop computer, or a tablet computer, among others. The first computing device 102 and the second computing device 104 may each include a graphical user interface (GUI) 104.

The first user 120 and the second user 122 may interact with the GUI 104 of the first computing device 102 and the second computing device 103, respectively, via a device. The device may include: a stylus pen, a mouse, or a finger of the user, among other examples. In some examples, the first user 120 may utilize the device on the GUI of the first computing device 102 to: add, modify, or delete content (e.g., textual content, audio content, and/or graphical content) associated with the textual data prompt 108.

The first computing device 102 may communicate via a proxy server 110 with the second computing device 103. The proxy server 110 may include numerous engines/modules, such as a cognitive analysis engine 112 and/or a storage engine 119, among others. In an example, the proxy server 110 may receive, from the first computing device 102, a textual data prompt 108. The textual data prompt 108 may include one or more: words, sentences, paragraphs, or pages of textual data. In some examples, the textual data prompt 108 may include sentences in the form of questions.

Next, the proxy server 110 may parse the textual data prompt 108 to identify parameters. The parameters include at least a topic of the textual data prompt 108 and an intent associated with the textual data prompt 108. In some examples, the parameters may additionally include: keywords of the textual data prompt 108 (e.g., "very satisfied," "satisfied," "normal," "dislike," etc.), interrogative words associated with the textual data prompt 108 (e.g., "what," "when," "where," "who," "whom," "why," and "how"), a sender of the textual data prompt 108 (e.g., the first user 120), and/or a recipient of the textual data prompt 108 (e.g., the second user 122), among others. The parameters may also include adjectives associated with the keywords, verbs associated with the keywords, and nouns associated with the keywords. The sender of the textual data prompt 108 and the recipient of the textual data prompt 108 may include individuals and/or entities.

Next, the proxy server 110 may execute an algorithm to compare the parameters of the textual data prompt 108 to additional parameters associated with widgets. In some examples, the algorithm performs a one-on-one comparison of the parameters associated with the textual data prompt 108 to the additional parameters associated with the widgets. In additional examples, the algorithm may include: a pattern matching algorithm, a linguistic algorithm, and/or a reinforcement learning algorithm, and combinations thereof.

A widget is an element that the first user 120 or the second user 122 may interact with on the GUI 104, where each widget facilitates a specific type of user-computer interaction, and appears as a visible part of the application's GUI 104 as defined by the theme and rendered by the rendering engine. Examples of the widgets include a button widget (e.g., a radio button widget, a check box widget, a split button widget, a cycle button widget, etc.), a slider widget, a list box widget, a spinner widget, a drop-down list widget, a menu widget (e.g., a context menu widget, a pie menu widget, etc.), a menu bar widget, a scroll bar widget, a toolbar widget (e.g., a ribbon widget), an icon widget, and/or a tree view widget, among others. Further examples of the widgets contemplated in the instant invention include: a date selection widget, a response selection widget, a time selection widget, and/or a location selection widget, among others. In some examples, the widgets may be stored in a database or a server. In other examples, the widgets may be stored in the storage engine 119 of the proxy server 110.

Then, the proxy server 110 may identify a first match between the parameters associated with the textual data prompt 108 and the additional parameters associated with a first widget 118 of the widgets (e.g., the location selection widget). The proxy server 110 may further identify a second match between the parameters associated with the textual data prompt 108 and the additional parameters associated with a second widget of the widgets (e.g., the time selection widget).

In some examples, a confidence threshold may be applied to the first match and the second match. In some examples, if the first match exceeds the confidence threshold and the second match fails to exceed the confidence threshold, the proxy server 110 may generate the first widget 118 (e.g., the location selection widget) embedded within the GUI 104 on the second computing device 103. In other examples, a confidence score (e.g., the confidence threshold) may be applied to the first match and the second match. The confidence score for the first match and the second match may be in a range of zero to one. For example, if the confidence score of the first match is 0.7, or 70%, and the confidence score of the second match is 0.4, or 40%, the first match achieves a higher confidence score. Responsive to this determination, the proxy server 110 may generate the first widget 118 (e.g., the location selection widget) embedded within the GUI 104 on the second computing device 103. In some examples, the first widget 118 is generated in real-time.

According to some examples, a size, a shape, and a color of the first widget is based on the confidence threshold. In this illustrative example, the first widget (e.g., the location selection widget) may include at least two responses to the textual data prompt 108. In examples, the first widget (e.g., the location selection widget) may include at least a first response to the textual data prompt 108 (e.g., 100 Main Street) and a second response to the textual data prompt 108 (e.g., 120 Main Street). It should be appreciated that in other examples, the first widget may include multiple responses to the textual data prompt 108.

Moreover, in some examples, the proxy server 110 may receive a selection of the first response (e.g., 100 Main Street) as a selected response to the textual data prompt 108 by the second user 122 associated with the second computing device 103. In response, the proxy server 110 may display the first response (e.g., 100 Main Street) as textual data 109 embedded within the GUI of the first computing device 102. A size and a color of the textual data mirrors or is identical to the size and color of the first widget.

The functionality of the components shown in FIG. 1 is described in more detail in the discussion of FIG. 2A, FIG. 2B, FIG. 2C, FIG. 3, and FIG. 4 presented below.

Figure 2A:
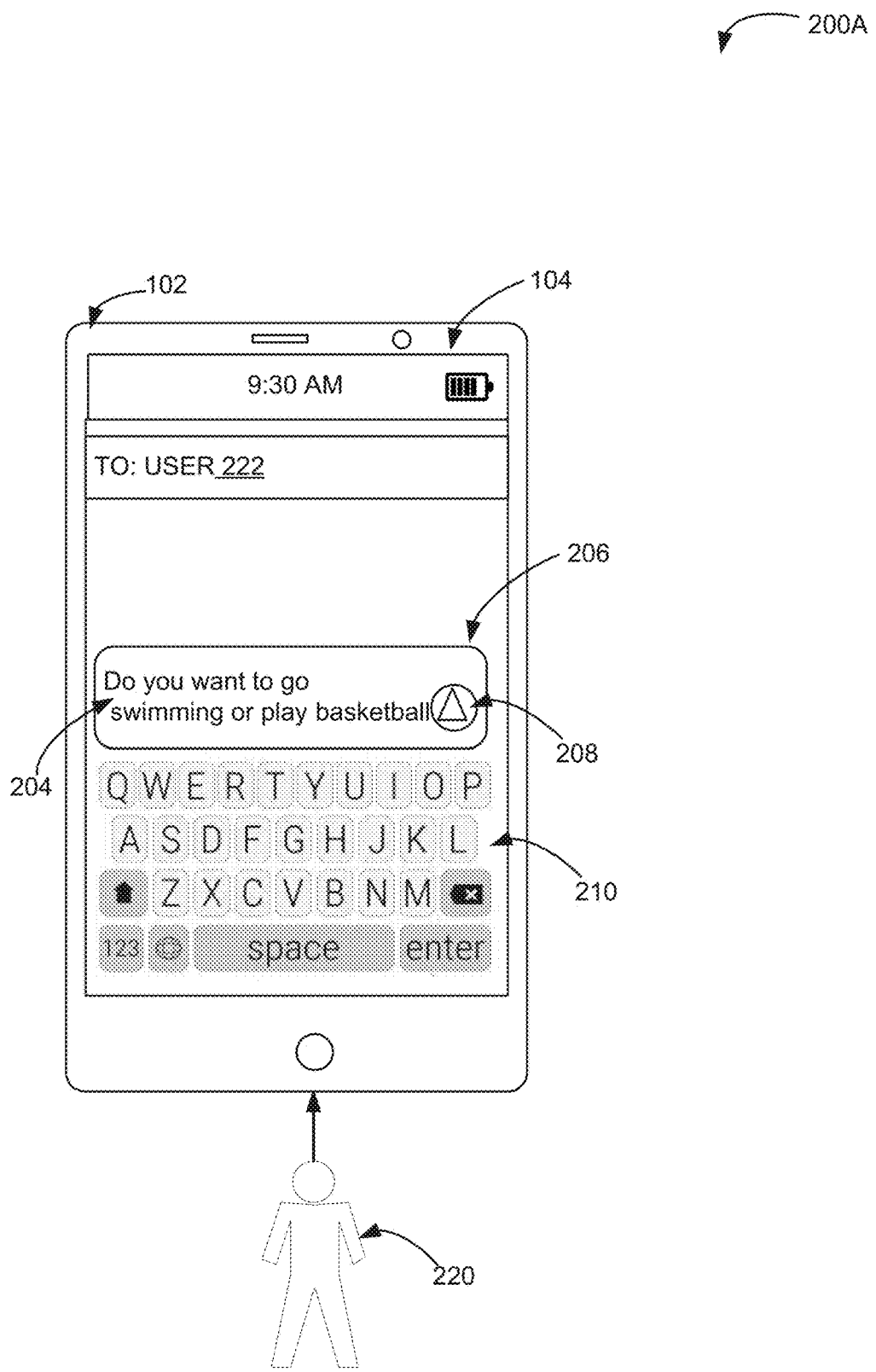
FIG. 2A illustrates a schematic diagram including a textual data prompt being input by a first user on a first computing device, in accordance with embodiments of the present invention.

FIG. 2A illustrates a schematic diagram including a textual data prompt being input by a first user on a first computing device, in accordance with embodiments of the present invention.

A schematic diagram 200A displays a first computing device 102 associated with a first user 220. The first user 220 may interact with a graphical user interface (GUI) 104 of the first computing device 102 via a device. In an illustrative example, the first user 220 may utilize the device on a keyboard 210 to input, modify, or delete audio, graphical, or video content. The keyboard 210 is a set of keys that enables the first user 220 to enter content into the first computing device 102. The keyboard 210 may include alphanumeric keys, punctuation keys, and/or special keys, among others. In some examples, the first user 220 may utilize the device on the keyboard 210 to add textual content 204 to a pane 206 embedded within the GUI 104 of the first computing device 102.

In the given illustration, the first user 220 may input, via the device, the textual content 204 including "Do you want to go swimming or play basketball" into the pane 206. The first user 220 may additionally transmit this textual content 204 to a second user 222 by executing an action (e.g., such as a clicking action) on a send button 208. Responsive to this action, the proxy server 110 (of FIG. 1) may receive the textual data prompt 108 (of FIG. 1) and may then parse the textual data prompt 108 to identify parameters that include at least a topic of the textual data prompt 108 and an intent associated with the textual data prompt 108.

The proxy server 110 may further utilize one or more algorithms, such as a linguistic processing algorithm, to identify the topic and the intent associated with the textual data prompt 108. For example, the intent may be a positive, a neutral, or a negative intent. The topic of the textual data prompt 108 may vary and may include multiple topics and subjects, including: the weather, a job interview, a music festival, a basketball game, etc. In this illustrative example, the intent is a neutral intent (as the first user 220 is merely asking the second user 222 of which activity the second user 222 would like to engage in) and the topic includes exercise (as the two choices of activities include two sports: swimming and basketball).

In other examples, the textual data prompt 108 could convey a positive intent (e.g., "I can't wait to play basketball with you today") or could convey a negative intent (e.g., "I can't believe you aren't available to play basketball today"). In further examples, the proxy server 110 may identify additional parameters associated with the textual data prompt 108, such as keywords (e.g., "swimming" and "basketball"), interrogative words (e.g., "what"), a sender (e.g., the first user 220), and a recipient (e.g., the second user 222) topic of the textual data prompt 108. Next, the proxy server 110 may execute the same algorithm(s) or additional algorithm(s) to compare the parameters associated with the textual data prompt 108 to additional parameters associated with widgets stored in a storage engine 119. As explained in relation to FIG. 1, numerous algorithms are contemplated and the list given for FIG. 1 is non-exhaustive.

In some examples, the algorithm may perform a one-on-one comparison of the parameters associated with the textual data prompt 108 to the additional parameters associated with widgets. For example, the proxy server 110 may compare the neutral exercise topic and neutral intent of the textual data prompt 108 to additional parameters associated with a first widget 118. The proxy server 110 may also compare the keywords "swimming" and "basketball" associated with the textual data prompt 108 to the keyword "sports" associated with the first widget 118. Based on these comparisons, the proxy server 110 may identify a first match between the parameters associated with the textual data prompt 108 and the additional parameters associated with the first widget 118. Moreover, the proxy server 110 may compare the neutral exercise topic, the neutral intent, and keywords of the textual data prompt 108 to additional parameters associated with a second widget of the widgets. Based on these comparisons, the proxy server 110 may identify a second match between the parameters associated with the textual data prompt 108 and the additional parameters associated with the second widget. The proxy server 110 may then identify a confidence threshold associated with the first match and another confidence threshold associated with the second match.

Figure 2B:
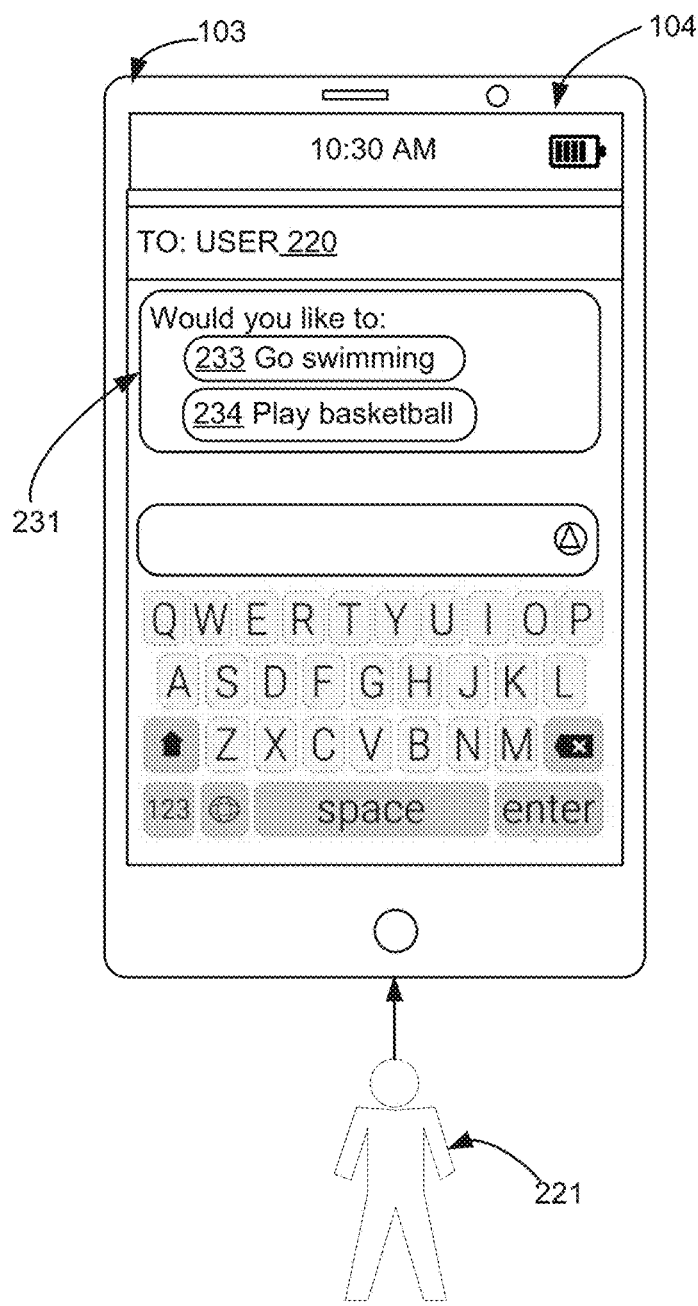
FIG. 2B illustrates a schematic diagram showcasing generation of a first widget embedded with a graphical user interface (GUI) on a second computing device, in accordance with embodiments of the present invention.

FIG. 2B illustrates a schematic diagram showcasing generation of a first widget embedded with a graphical user interface (GUI) on a second computing device, in accordance with embodiments of the present invention.

A schematic diagram 200B includes a second computing device 103 associated with a second user 221. The second user 221 may interact with the GUI 104 of the second computing device 103 via a device. Responsive to execution of the steps of FIG. 2A, the proxy server 110 (of FIG. 1) may determine that the percentage of the first match exceeds a confidence threshold, whereas the percentage of the second match fails to exceed the confidence threshold. Responsive to this determination, the proxy server 110 may generate the first widget 231 embedded within the GUI 104 or in concatenation to the GUI 104 on the second computing device 103.

The first widget 231 may include one or more responses to the textual data prompt 108 (of FIG. 1). It should be appreciated that in some examples, the first widget 231 may only include two responses to the textual data prompt 108. It should be appreciated that in other examples, the first widget 231 may include multiple responses to the textual data prompt 108. In the illustrative example, the first widget 231 may include a first response (e.g., "Go Swimming") 233 to the textual data prompt 108 and a second response (e.g., "Play Basketball") 234 to the textual data prompt 108.

Moreover, a size of the first widget 231, a shape of the first widget 231, and a color of the first widget 231 is based on the confidence threshold. For example, a greater confidence threshold results in: a larger size of the first widget 231, the shape of the first widget 231 having more smooth or rounded sides than edges, and the color of the first widget 231 comprising one or more: light hues, light tints, light shades, and/or light tones. Further, a lower confidence threshold results in: a smaller size of the first widget 231, the shape of the first widget 231 having more edges than smooth or rounded sides, and the color of the first widget 231 comprising one or more: dark hues, dark tints, dark shades, and/or dark tones. It should be appreciated that the shape of the first widget 231 or the second widget may include: a polygonal shape or a curved shape, or may alternatively include one or more polygonal sides or one or more curved sides.

The one or more: light hues, light tints, light shades, and/or light tones are defined by a high color saturation, or a high intensity of one or more colors of the first widget 231. For example, these one or more light hues, light tints, light shades, and/or light tones may include: white, gray (e.g., platinum, silver, etc.), magenta (e.g., folly, amaranth pink, fuschia, etc.), pink, brown (e.g., amber, wheat, desert sand, beige, fawn, tan, khaki, etc.), orange (e.g., apricot, peach-yellow, sunset, gold, champagne, papaya whip, peach, peach-orange, etc.), yellow (e.g., buff, cream, lemon chiffon, yellow, flax, etc.), blue (e.g., celeste, baby blue, electric blue, cyan, etc.), etc. It should be appreciated that this list is non-exhaustive and additional colors are contemplated.

The one or more: dark hues, dark tints, dark shades, and/or dark tones are defined by a low color saturation (e.g., the expression of a bandwidth of light from a source), or a low intensity of one or more colors of the first widget 231. For example, these one or more dark hues, dark tints, dark shades, and/or dark tones may include: gray (including charcoal, purple taupe, slate gray, gunmetal, etc.), black (including bistre, black bean, eerie black, licorice, midnight blue, onyx, outer space, raisin black etc.), magenta (including amaranth, amaranth purple, crimson, eggplant, folly, quinacridone magenta, raspberry, red-violet, magenta haze, plum, mulberry, telemagenta, etc.), pink (including carmine, crimson, ruby, etc.), red (including blood red, burgundy, carmine, dark red, wine, tyrian purple, maroon, oxblood, turkey red, etc.), brown (including auburn, seal brown, wenge, bistre, chestnut, chocolate, coffee, taupe, umber, etc.), blue (including federal blue, ultramarine, oxford blue, indigo, cobalt blue, dark blue, etc.), green (including Brunswick green, phthalo green, dark green, office green, midnight green, castleton green, etc.), etc. It should be appreciated that this list is non-exhaustive and additional colors are contemplated.

Assuming the first widget 231 has a higher confidence threshold than a second widget, the first widget 231, in comparison to the second widget, will have: a larger size and coloring including one or more: light hues, light tints, light shades, and/or light tones. Further, in this case, the second widget, as compared to the first widget 231, will have a smaller size and coloring including one or more: dark hues, dark tints, dark shades, and/or dark tones. Moreover, the first widget 231 will have more smooth or rounded sides than edges and the second widget will have more edges than smooth or rounded sides.

Figure 2C:
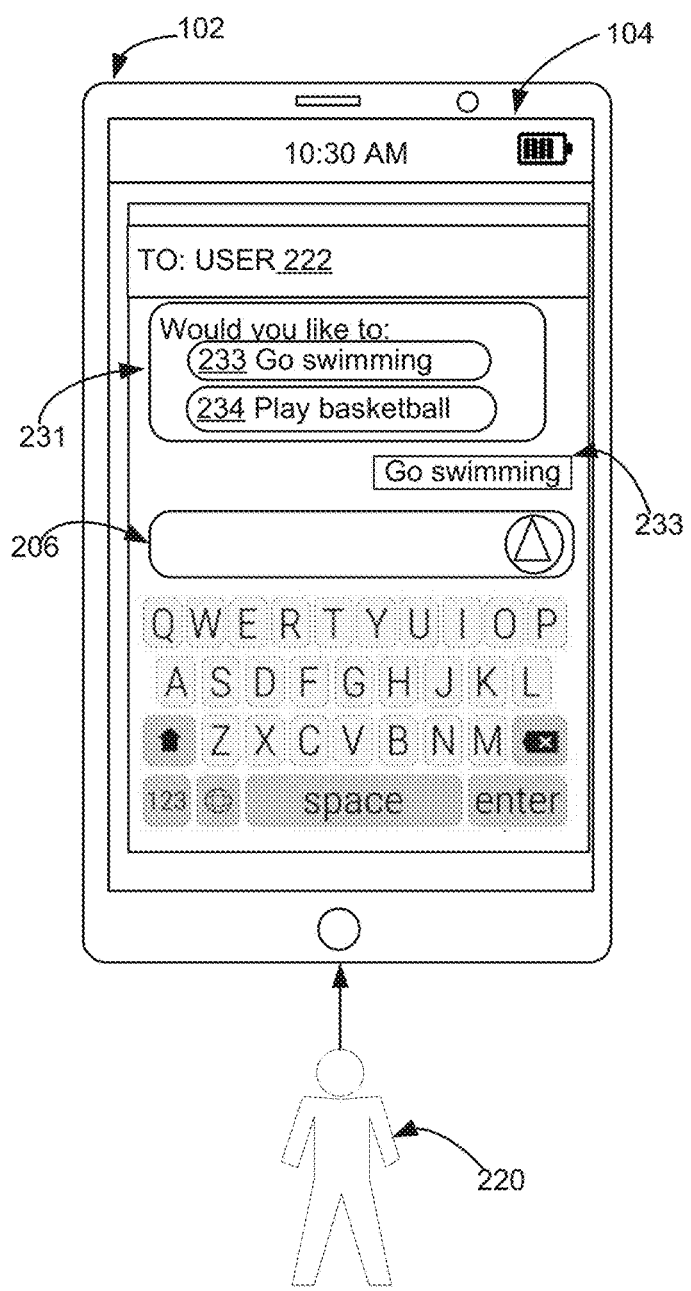
FIG. 2C illustrates a schematic diagram include display of a first response as textual data embedded with a graphical user interface (GUI) on a first computing device, in accordance with embodiments of the present invention.

FIG. 2C illustrates a schematic diagram include display of a first response as textual data embedded with a graphical user interface (GUI) on a first computing device, in accordance with embodiments of the present invention.

A schematic diagram 200C includes a first computing device 102 associated with a first user 220. The first user 220 may interact with a GUI 104 of the first computing device 102 via a device. Based on the match between the parameters of the textual data prompt 108 and additional parameters associated with widgets exceeding the confidence threshold, as described supra, the proxy server 110 (of FIG. 1) may generate the first widget 231 having a larger size, more rounded or smooth sides than edges, and lighter-coloring. Based on the enhanced confidence in the accuracy of the generated widget, the proxy server 110 may then receive a selection of the first response 233 from the first widget 231 as a selected response to the textual data prompt 108 (of FIG. 1) by the second user 222. Then, the proxy server 110 may display the first response 233 as textual data embedded within the GUI 104 of the second computing device 103.

In some examples, a size and a color of the text in the first response 233 mirrors the size and the color of the first widget 231. For example, as the first match achieved and surpassed the confidence threshold, the first widget 231 was generated with the following characteristics: large widget size, a coloring having one or more: light hues, light tints, light shades, and/or light tones, and more smooth sides or edges. In this example, the first response 233 (e.g., "Go swimming") will be embedded within the GUI 104 with the following characteristics: a large font size and one or more light hues, light tints, light shades, and/or light tones in the coloring of the text. In further examples, an animation or effects associated with the textual data of the first response 233 mirrors and is identical to an animation or the effects associated with the first widget 231.

In additional examples, when the second user 222 views the first widget 231, if the first widget 231 has a smaller size, is of darker coloring, and contains more edges than smooth sides in its shape, conveying a lower accuracy associated with the confidence threshold, the second user 222 may fail to select one of the first response 233 or the second response 234. The proxy server 110 may fail to receive the selection of the first response 233 or the second response 234 to the textual data prompt 108. The proxy server 110 may then prompt the second user 221 via a notification within the GUI on the second computing device 103 to input a textual response. Once the proxy server 110 receives the textual response from the second user 221, the proxy server 110 may transmit the textual response to the first computing device 102 for display within the GUI.

In further examples, when a third user engages in another textual data prompt associated with the same topic of the textual data prompt 108 and the same intent of the textual data prompt 108, the proxy server 110 may utilize one or more additional algorithms, such as a reinforcement learning algorithm, to automatically generate the first widget 231 embedded within a third computing device and associated with the third user.

Figure 3:
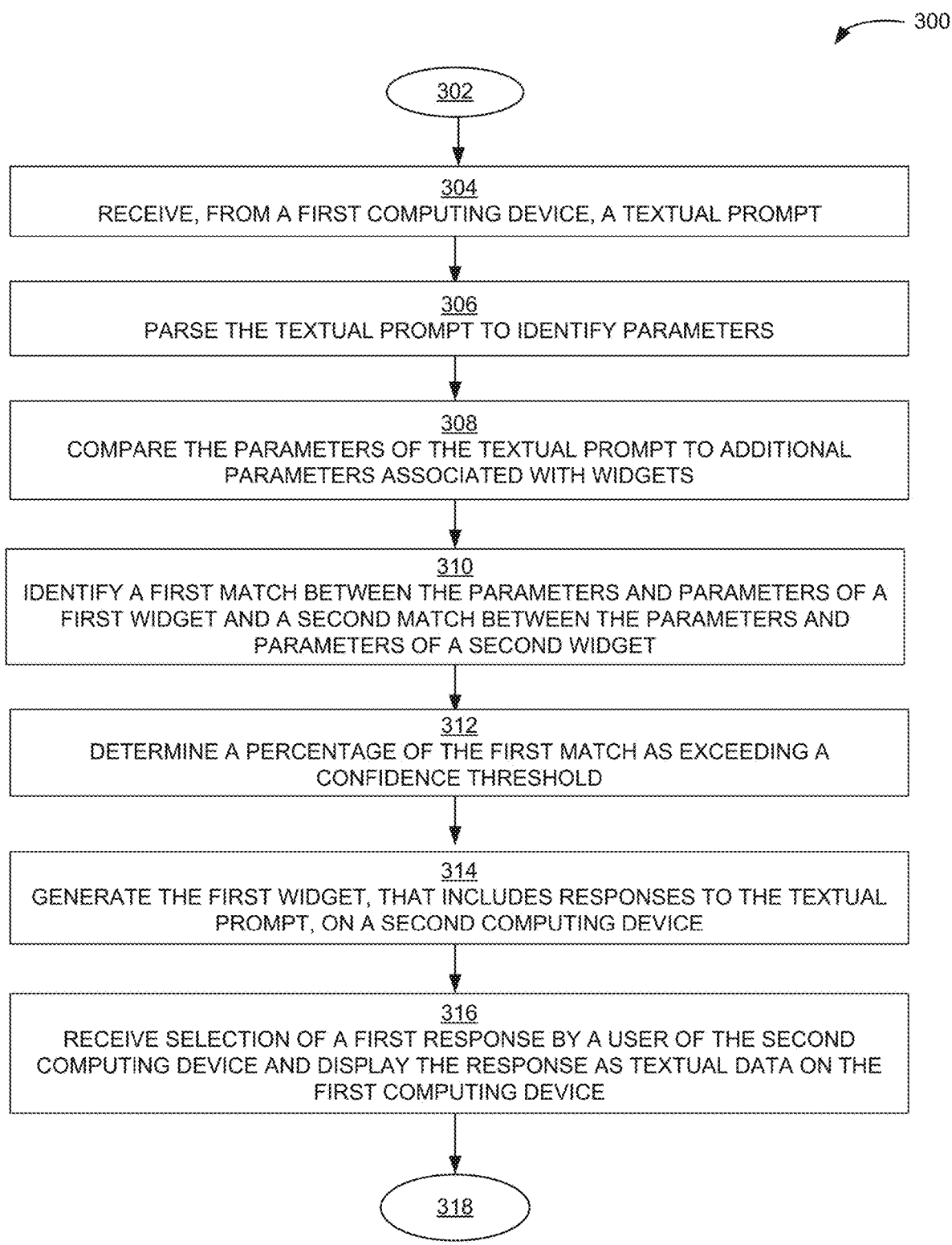
FIG. 3 is a flowchart of a process executed by a server to automatically convert a textual data prompt embedded within a GUI to a widget, in accordance with embodiments of the present invention.

FIG. 3 is a is a flowchart of a process executed by a server to automatically convert a textual data prompt embedded within a GUI to a widget, in accordance with embodiments of the present invention.

The process 300 of FIG. 3 may be implemented by a service, a system, a server, engine(s) of a computing device or computer system, or application(s) of a computing device or computer system. The process of FIG. 3 begins at a step 302. The step 302 is followed by a step 304, where a server (such as the proxy server 110 of FIG. 1) receives, from a first computing device, a textual data prompt. The step 304 is followed by a step 306, where the server parses the textual data prompt to identify parameters. The parameters are associated with the textual data prompt and include at least a topic of the textual data prompt and an intent associated with the textual data prompt. In some examples, the parameters may further include: keywords of the textual data prompt, interrogative words of the textual data prompt, a sender of the textual data prompt, a recipient of the textual data prompt, and combinations thereof.

The step 306 is followed by a step 308, where the server compares the parameters of the textual data prompt to additional parameters associated with widgets. The widgets may be stored in a database or a server (e.g., in the storage engine 119 of the proxy server 110). In some examples, the server performs this step via one or more algorithms. In some examples, the algorithm(s) may include a pattern matching algorithm, a linguistic algorithm, a reinforcement learning algorithm, and combinations thereof. In further examples, the algorithm(s) may perform a one-on-one comparison of the parameters associated with the textual data prompt to the additional parameters associated with the widgets.

The step 308 is followed by a step 310, where the server identifies a first match between the parameters and the additional parameters associated with a first widget of the widgets. The server may further identify a second match between the parameters and the additional parameters associated with a second widget of the widgets. The step 310 is followed by a step 312, where the server determines a percentage of the first match as exceeding a confidence threshold. The server also determines a percentage of the second match as failing to exceed the confidence threshold.

The step 312 is followed by a step 314, where the server generates the first widget embedded within the GUI on a second computing device in response to the step 312. The first widget includes responses to the textual data prompt, such as a first response to the textual data prompt and a second response to the textual data prompt. Moreover, a size, a shape, and a color of the first widget is based on the confidence threshold. In further examples, the first widget is generated in real-time.

The step 314 is followed by a step 316, where the server receives a selection of the first response as a selected response to the textual data prompt by a user associated with the second computing device. In response to this, the server displays the first response as textual data embedded within the GUI of the first computing device. A size and a color of the textual data mirrors and is identical to the size and the color of the first widget. In additional examples, an animation of the textual data mirrors the animation of the first widget.

In some examples, the server may fail to receive the selection, by the user associated with the second computing device, of the selected response to the textual data prompt. The server may then prompt the user, via one or more notifications within the GUI on the second computing device, to input a textual response to the textual data prompt. Responsive to receiving, from the user, the textual response, the server may transmit the textual response to the first computing device for display within the GUI.

In additional examples, the server may utilize a reinforcement learning algorithm such that when a third user engages in another textual data prompt associated with the topic of the textual data prompt and the intent of the textual data prompt, automatically generating the first widget embedded within a third computing device associated with the third user.

Figure 4:
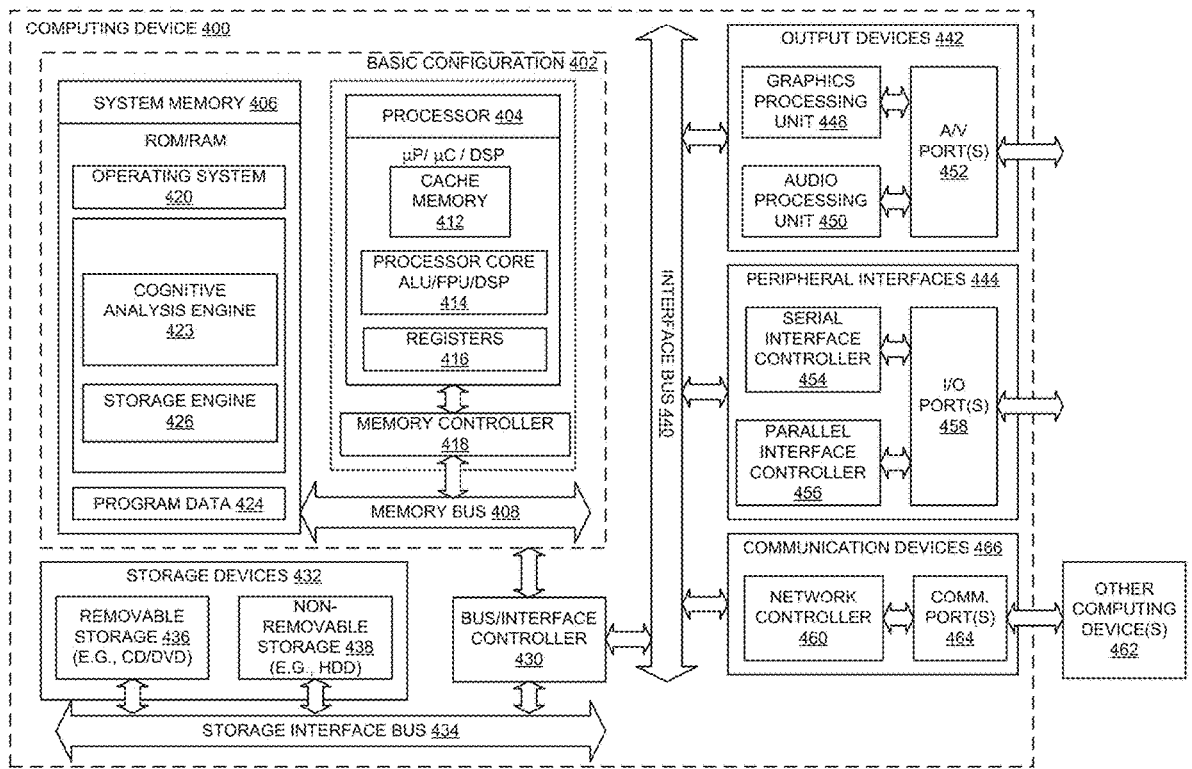
FIG. 4 is a block diagram of a computing device included within the system of FIG. 1 and that implements the processes of FIG. 3, in accordance with embodiments of the present invention.

FIG. 4 is a block diagram of a computing device included within the system of FIG. 1 and that implements the processes of FIG. 3, in accordance with embodiments of the present invention.

In some embodiments, the present invention may be a server, a service, a method, a system, and/or a computer program product. For example, a server (e.g., a proxy server 110 of FIG. 1 or a cognitive analysis server) may be configured to automatically convert a textual data prompt 108 (of FIG. 1) embedded within a GUI 104 (of FIG. 1) to a widget (e.g., the first widget 118 of FIG. 1).

In an example, basic configuration 402, the computing device 400 includes one or more processors 404 and a system memory 406. A memory bus 408 is used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a level cache memory 412, an example processor core 414, and registers 416, among other examples. The example processor core 414 may include an arithmetic logic unit (ALU), a floating point unit (FPU), a digital signal processing core (DSP Core), or any combination thereof. An example memory controller 418 is used with the processor 404, or in some implementations the example memory controller 418 is an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 includes an operating system 420, one or more engines (such as a cognitive analysis engine 423 and/or a storage engine 426) and program data 424, among other engines/modules. In some embodiments, the cognitive analysis engine 423 may be a cognitive analysis application or a cognitive analysis service.

The cognitive analysis engine 423 may receive, from a first computing device 102, the textual data prompt; parse the textual data prompt 108 to identify parameters that include at least a topic of the textual data prompt 108 and an intent associated with the textual data prompt 108; execute an algorithm to compare the parameters of the textual data prompt 108 to additional parameters associated with widgets; identify a first match between the parameters and the additional parameters associated with a first widget 118 of the widgets; and identify a second match between the parameters and the additional parameters associated with a second widget of the widgets. In response to determining that a percentage of the first match exceeds a confidence threshold and a percentage of the second match fails to exceed the confidence threshold, the cognitive analysis engine 423 may generate the first widget 118 embedded within the GUI 104 on a second computing device 103. The first widget 118 may include one or more responses to the textual data prompt 108. Moreover, a size, a shape, and a color of the first widget 118 is based on the confidence threshold. The cognitive analysis engine 423 may then receive a selection of the first response 233 as a selected response to the textual data prompt 108 by a user associated with the second computing device 103. The cognitive analysis engine 423 may then display the first response 233 as textual data embedded within the GUI 104 of the first computing device 102.

The computing device 400 may have additional features or functionality, and additional interfaces to facilitate communications between the basic configuration 402 and any desired devices and interfaces. For example, a bus/interface controller 430 is used to facilitate communications between the basic configuration 402 and data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives, among others. Example computer storage media includes volatile and non-volatile, removable and non-removable media implemented in any method or technology for storage of information, such as computer-readable instructions, data structures, program modules, or other data.

In some embodiments, an interface bus 440 facilitates communication from various interface devices (e.g., one or more output devices 442, one or more peripheral interfaces 444, and one or more communication devices 466) to the basic configuration 402 via the bus/interface controller 430. Some of the one or more output devices 442 include a graphics processing unit 448 and an audio processing unit 450, which is configured to communicate to various external devices such as a display or speakers via one or more A/V ports 452. The one or more peripheral interfaces 444 includes a serial interface controller 454 or a parallel interface controller 456, which are configured to communicate with external devices, such as input devices (e.g., keyboard, mouse, pen, voice input device, touch input device, etc.) or other peripheral devices (e.g., printer, scanner, etc.) via one or more I/O ports 458. An example of the one or more communication devices 466 include a network controller 460, which are arranged to facilitate communications with one or more other computing devices 462 over a network communication link via one or more communication ports 464. The one or more other computing devices 462 include servers, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media include wired media, such as a wired network or direct-wired connection, and wireless media, such as acoustic, radio frequency (RF), microwave, infrared (IR), and other wireless media. The term "computer-readable media," as used herein, includes both storage media and communication media.

The system memory 406, the removable storage devices 436, and the non-removable storage devices 438 are examples of the computer-readable storage media. The computer-readable storage media is a tangible device that can retain and store instructions (e.g., program code) for use by an instruction execution device (e.g., the computing device 400). Any such, computer storage media is part of the computing device 400.

Aspects of the present invention are described herein regarding schematic diagrams, flowchart illustrations, and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by the computer-readable instructions (e.g., the program code).

The computer-readable instructions are provided to the processor 404 of a general purpose computer, special purpose computer, or other programmable data processing apparatus (e.g., the computing device 400) to produce a machine, such that the instructions, which execute via the processor 404 of the computer or other programmable data processing apparatus, create means for implementing the functions/acts specified in the flowchart and/or block diagram block or blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable instructions (e.g., the program code) are also loaded onto a computer (e.g. the computing device 400), another programmable data processing apparatus, or another device to cause a series of operational steps to be performed on the computer, the other programmable apparatus, or the other device to produce a computer implemented process, such that the instructions which execute on the computer, the other programmable apparatus, or the other device implement the functions/acts specified in the flowchart and/or block diagram block or blocks.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computing device 400 may be implemented as a part of a general purpose or specialized server, mainframe, or similar computer that includes any of the above functions. The computing device 400 may also be implemented as a personal computer including both laptop computer and non-laptop computer configurations.

Another embodiment of the invention provides a method that performs the process steps on a subscription, advertising and/or fee basis. That is, a service provider, such as a Solution Integrator, can offer to create, maintain, and/or support, etc. a process of automatically converting a textual data prompt embedded within a graphical user interface (GUI) to a widget. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A server configured to execute a method for automatically converting a textual data prompt embedded within a graphical user interface (GUI) to a widget, the method comprising:
   receiving, from a first computing device, the textual data prompt;
   parsing the textual data prompt to identify parameters that include at least a topic of the textual data prompt and an intent associated with the textual data prompt;
   executing an algorithm to compare the parameters of the textual data prompt to additional parameters associated with widgets;
   identifying a first match between the parameters and the additional parameters associated with a first widget of the widgets;
   identifying a second match between the parameters and the additional parameters associated with a second widget of the widgets;
   in response to determining that a percentage of the first match exceeds a confidence threshold and a percentage of the second match fails to exceed the confidence threshold, generating the first widget embedded within the GUI on a second computing device, wherein:
      the first widget includes a first response to the textual data prompt and a second response to the textual data prompt, and
      a size, a shape, and a color of the first widget is based on the confidence threshold;
   receiving a selection of the first response as a selected response to the textual data prompt by a user associated with the second computing device; and
   displaying the first response as textual data embedded within the GUI of the first computing device.

2. The server of claim 1, wherein the method further comprises:
   identifying the color of the second widget associated with the second match as including one or more: dark hues, dark tints, dark shades, and/or dark tones.

3. The server of claim 2, wherein the method further comprises:
   identifying the shape of the first widget as having more edges than round or smooth sides.

4. The server of claim 1, wherein the method further comprises:
   identifying the color of the first widget as including one or more light hues, light tints, light shades, and/or light tones.

5. The server of claim 4, wherein the method further comprises:
   identifying the shape of the first widget as having more round or smooth sides than edges.

6. The server of claim 1, wherein the size of the second widget associated with the second match is smaller than the size of the first widget associated with the first match.

7. The server of claim 1, wherein a size and a color of the textual data mirrors the size and the color of the first widget.

8. The server of claim 1, wherein the method further comprises:
utilizing the algorithm to perform the parsing, the comparing, the identifying, and the generating steps.

9. The server of claim 8, wherein the algorithm is selected from the group comprising: a pattern matching algorithm, a linguistic algorithm, a reinforcement learning algorithm, and combinations thereof.

10. A method for automatically converting a textual data prompt embedded within a graphical user interface (GUI) to a widget, the method comprising:
receiving, from a first computing device, the textual data prompt;
parsing the textual data prompt to identify parameters that include at least a topic of the textual data prompt and an intent associated with the textual data prompt;
executing an algorithm to compare the parameters of the textual data prompt to additional parameters associated with widgets;
identifying a first match between the parameters and the additional parameters associated with a first widget of the widgets;
identifying a second match between the parameters and the additional parameters associated with a second widget of the widgets;
in response to determining that a percentage of the first match exceeds a confidence threshold and a percentage of the second match fails to exceed the confidence threshold, generating the first widget embedded within the GUI on a second computing device, wherein:
the first widget includes a first response to the textual data prompt and a second response to the textual data prompt, and
a size, a shape, and a color of the first widget is based on the confidence threshold;
receiving a selection of the first response as a selected response to the textual data prompt by a user associated with the second computing device; and
displaying the first response as textual data embedded within the GUI of the first computing device.

11. The method of claim 10, further comprising:
utilizing the algorithm to perform the parsing, the comparing, the identifying, and the generating steps, wherein the algorithm is selected from the group comprising: a pattern matching algorithm, a linguistic algorithm, a reinforcement learning algorithm, and combinations thereof.

12. The method of claim 10, further comprising:
failing to receive the selection, by the user associated with the second computing device, of the selected response to the textual data prompt;
prompting the user, via a notification within the GUI on the second computing device, to input a textual response to the textual data prompt;
receiving, from the user, the textual response; and
transmitting the textual response to the first computing device for display within the GUI.

13. The method of claim 10, further comprising:
identifying the color of the second widget associated with the second match as including one or more: dark hues, dark tints, dark shades, and/or dark tones; and
identifying the shape of the second widget as having more edges than round or smooth sides.

14. The method of claim 10, further comprising:
identifying the color of the first widget as including one or more: light hues, light tints, light shades, and/or light tones; and
identifying the shape of the first widget as having more round or smooth sides than edges.

15. The method of claim 10, wherein execution of the algorithm performs a one-on-one comparison of the parameters associated with the textual data prompt to the additional parameters associated with the widgets.

16. A computer program product, comprising one or more computer-readable hardware storage devices having computer-readable program code stored therein, the computer-readable program code containing instructions executable by one or more processors of a computer system to implement a method to automatically convert a textual data prompt embedded within a graphical user interface (GUI) to a widget, the method comprising:
receiving, from a first computing device, the textual data prompt;
parsing the textual data prompt to identify parameters that include at least a topic of the textual data prompt and an intent associated with the textual data prompt;
executing an algorithm to compare the parameters of the textual data prompt to additional parameters associated with widgets;
identifying a first match between the parameters and the additional parameters associated with a first widget of the widgets;
identifying a second match between the parameters and the additional parameters associated with a second widget of the widgets;
in response to determining that a percentage of the first match exceeds a confidence threshold and a percentage of the second match fails to exceed the confidence threshold, generating the first widget embedded within the GUI on a second computing device, wherein:
the first widget includes a first response to the textual data prompt and a second response to the textual data prompt, and
a size, a shape, and a color of the first widget is based on the confidence threshold;
receiving a selection of the first response as a selected response to the textual data prompt by a user associated with the second computing device; and
displaying the first response as textual data embedded within the GUI of the first computing device.

17. The computer program product of claim 16, wherein the first widget is selected from the group comprising: a date selection widget, a response selection widget, a time selection widget, an event selection widget, and a location selection widget.

18. The computer program product of claim 16, wherein the first widget is generated in real-time.

19. The computer program product of claim 16, wherein the method further comprises:
utilizing a reinforcement learning algorithm such that when a third user engages in another textual data prompt associated with the topic of the textual data prompt and the intent of the textual data prompt, automatically generating the first widget embedded within a third computing device associated with the third user.

20. The computer program product of claim 16, wherein an animation of the textual data mirrors the animation of the first widget.

* * * * *